No. 731,669. Patented June 23, 1903.

UNITED STATES PATENT OFFICE.

EDWARD CULMANN, OF BUFFALO, NEW YORK, ASSIGNOR TO SCHOELLKOPF, HARTFORD & HANNA COMPANY, OF BUFFALO, NEW YORK.

GREEN SULFUR DYE AND PROCESS OF MAKING SAME.

SPECIFICATION forming part of Letters Patent No. 731,669, dated June 23, 1903.

Application filed September 30, 1902. Serial No. 125,437. (No specimens.)

*To all whom it may concern:*

Be it known that I, EDWARD CULMANN, a citizen of the Swiss Republic, and a resident of Buffalo, in the county of Erie and State of New York, have invented a new and useful Improvement in Green Sulfur Dyes, of which the following is a specification.

This invention has for its object to produce a green dyestuff from the hydrochloric-acid salts of amidoazobenzene or its homologue amidoazotoluene.

In practicing my invention the hydrochloric-acid salt of amidoazobenzene or amidoazotoluene is melted, together with para-amidophenol, in about equal parts for about three hours at a temperature of about 180° centigrade. The melt of amidoazobenzene hydrochlorid and para-amidophenol is soluble in a watery solution of caustic soda with a blue color, while the melt of amidoazotoluene hydrochlorid and para-amidophenol dissolves in the same solution with a reddish-violet color. By boiling either of these melts with sodium sulfid and sulfur a green dyestuff is produced which dyes cotton directly in a bath containing sodium sulfid. I prefer to add a copper salt, whereby a somewhat more brilliant dyestuff is produced.

For example, one hundred and forty grains of sodium sulfid, fifty-five grains of sulfur, forty grains of melt made from amidoazobenzene or amidoazotoluene and para-amidophenol, fourteen grains of copper sulfate, and one hundred and thirty cubic centimeters of water are heated, preferably under a return-cooler, for about twenty-four hours at a temperature of about 102° to 105° centigrade and are then evaporated to dryness. The dyestuff so made from amidoazobenzene hydrochlorid and para-amidophenol dyes cotton in a bath containing alkali sulfid a dark shade of green similar to the shade usually called "Russian green." This dry color dissolves in water with a green color, and when an acid is added to this solution a dark-green precipitate is formed. This precipitate when dried dissolves in a solution of caustic soda with a blue-green color, in a solution of sodium sulfid with a dark-green color, and in concentrated sulfuric acid with a blue-black color. In a solution of carbonate of soda it is almost insoluble.

The dyestuff made as herein described from amidoazotoluene hydrochlorid and para-amidophenol dyes cotton olive green in a bath containing an alkali sulfid. This dyestuff when evaporated to dryness dissolves in water with a dirty-green-olive color. On adding an acid a dirty-green-black precipitate is separated. This dried precipitate dissolves in sodium sulfid with an olive-green color, in concentrated sulfuric acid with a greenish-black color, and is almost insoluble in caustic soda or carbonate of soda.

I wish it to be understood that I do not limit myself to amidoazobenzene, but that its homologue amidoazotoluene is also covered.

I claim as my invention—

1. The process of manufacturing a green coloring-matter which consists in boiling a melt of the hydrochloric-acid salt of amidoazobenzene, and para-amidophenol with sodium sulfid and sulfur, substantially as set forth.

2. The process of manufacturing a green coloring-matter which consists in boiling a melt of the hydrochloric-acid salt of amidoazobenzene, with sodium sulfid, sulfur and a copper salt, substantially as set forth.

3. The herein-described green dyestuffs prepared by boiling a melt of the hydrochloric-acid salt of amidobenzene, with sodium sulfid and sulfur, said dyestuff being of green color, almost insoluble in a watery solution of carbonate of soda, soluble in sodium sulfid with a green color and in concentrated sulfuric acid with a dark color, substantially as set forth.

Witness my hand this 26th day of September, 1902.

EDWARD CULMANN.

Witnesses:
FRED C. BONNER,
GEORGE MARQUARDT.